United States Patent [19]

Kutner

[11] 3,717,609

[45] Feb. 20, 1973

[54] FLAME RETARDANT POLYMERS
[75] Inventor: Abraham Kutner, Wilmington, Del.
[73] Assignee: Hercules Incorporated, Wilmington, Del.
[22] Filed: May 6, 1971
[21] Appl. No.: 140,949

[52] U.S. Cl. ...................260/45.75 K, 260/45.95 G
[51] Int. Cl. ...............................................C08f 45/62
[58] Field of Search............260/45.75 K, 45.95, 613

[56] References Cited

UNITED STATES PATENTS

| | | | |
|---|---|---|---|
| 3,075,944 | 1/1963 | Wick et al. .............................260/41 |
| 3,250,739 | 5/1969 | Sauer et al..........................260/45.75 |
| 3,400,174 | 9/1968 | Heidel et al. ..........................260/612 |
| 3,372,141 | 3/1968 | Dickerson et al. .................260/45.95 |
| 3,368,916 | 2/1968 | Hattori..............................260/45.75 |
| 3,282,882 | 11/1966 | Vuillemenot et al.................260/612 |
| 3,666,692 | 5/1972 | Paige et al............................260/2.5 |

*Primary Examiner*—Donald E. Czaja
*Assistant Examiner*—V. P. Hoke
*Attorney*—Edwin H. Dafter, Jr.

[57] ABSTRACT

Polyolefins based on propylene are made flame retardant by the addition of about 0.1 to 2 percent by weight of a dialkyltin mercaptoester and 0.1 to 2 percent by weight of an aromatic-aliphatic ether having at least one bromophenoxy linkage to an aliphatic radical and having at least three bromine substituents on each aromatic ring.

3 Claims, No Drawings

FLAME RETARDANT POLYMERS

This invention relates to flame retardant compositions based on stereoregular polymers of propylene.

In recent years, polypropylene and, in many cases, other polyolefins as well, have become recognized as having considerable potential utility as molded components in the automotive field, in appliance manufacture, and in the electrical industry. Additionally, fibers and yarns of polypropylene are becoming increasingly popular in carpeting and upholstery applications. In view of the nature of the applications in which this polymer is usually employed, good flame resistance and flame retardancy are imperative.

Considerable research effort has been extended toward the goal of improving the flame resistance of the polyolefins. While a fair degree of success has been realized, it has frequently been at the expense of other properties of the polymers. To be acceptable in commercial formulations, flame retardancy additives must be effective at low concentrations, must be stable at polymer processing temperatures and must not contribute excessively to polymer degradation at processing temperatures. Representative patents showing the state of the polyolefin flameproofing art include U.S. Pats. Nos. 3,075,944; 3,158,588; 3,368,916; 3,418,263; 3,419,518 and 3,432,461.

U.S. Pat. No. 3,075,944 teaches to incorporate 5 to 20 percent by weight of a 2,4,6-tribromoaniline derivative or 5 to 20 percent by weight of an halogenated diaromatic or aromatic-aliphatic ether having at least three halogen atoms attached to an aromatic group and 3 to 10 percent by weight of antimony trioxide. Thus, a minimum of 8 percent of the additive combination is required.

U.S. Pat. No. 3,158,888 teaches the incorporation of about 10 to 50 percent by weight of hexachlorodicylopentadiene and about 1 to 30 percent by weight of antimony oxide into a polyolefin.

U.S. Pat. No. 3,368,916 teaches incorporation of about 4 to 8% by weight of a bromine containing compound such as an ester of 2,3-dibromopropanol and phosphoric acid, and 0.2 to 1 percent of an organotin heat stabilizer into polystyrene and coating the surface of an article produced therefrom with an acrylic polymer.

U.S. Pat. No. 3,418,263 teaches the incorporation into a polyolefin of about 2 to 50 percent by weight of a halogenated cyclopentadiene Diels-Alder adduct, 1 to 30 percent by weight of antimony, arsenic, or bismuth oxide, and 0.1 to 3 percent by weight of a color stabilizer.

U.S. Pat. No. 3,419,518 teaches the incorporation of about 0.2 to 10 percent by weight of antimony trioxide and 1 to 13 percent of an aliphatic organic compound containing 45 to 93 percent bromine into polypropylene. Cycloalkanes are preferred brominated compounds.

U.S. Pat. No. 3,432,461 teaches the incorporation into a polymer of about 1 to 95 weight percent of arsenic, bismuth or antimony oxide, about 1 to 65 weight percent of dialkyl tin maleate or dialkyl tin glutaconate and 1 to 95 weight percent of a polybrominated hydrocarbon, preferably a polybrominated cycloalkyl hydrocarbon.

While all of the above formulations appear to have relatively good flame retardancy or flame resistance, all are subject to some other objection. For example, most of these additives must be employed in relatively large concentrations, causing adverse effects on the physical properties of the matrix polymer. In other cases, the additive must be employed in combination with antimony or a similar metal oxide which causes delustering of the polymer. Others are volatile or unstable at polymer processing temperatures, resulting in the liberation of objectionable decomposition products during processing.

It is the object of this invention to provide a flame retardant polypropylene composition which substantially overcomes the difficulties cited above. The novel flameproofing additive according to this invention is a combination of a bromophenyl ether of an aliphatic hydrocarbon and an alkyltin mercaptoester. Specifically, the invention is a flame retardant polymer composition comprising:

a. about 96 to 99.8 percent by weight of a stereoregular propylene polymer, b. about 0.1 to 2 percent by weight of a dialkyltin mercaptoester having the general formula

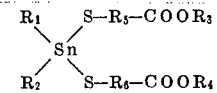

where $R_1$, $R_2$, and $R_3$ and $R_4$ are the same or different alkyl groups having 1 to 18 carbon atoms and $R_5$ and $R_6$ are the same or different alkylene groups having 1 to 17 carbon atoms; and c. about 0.1 to 2 percent by weight of a bromophenyl ether having the formula

where $R_7$ is a saturated or unsaturated aliphatic radical having 3 to 5 carbon atoms, optionally substituted with one or more bromine atoms, $y$ is an integer from 3 to 5 and $x$ is an integer from 1 to 2. The preferred concentrations of the additives are about 0.25 to 1 percent of the mercaptoester and 0.5 to 1% of the bromophenyl ether.

It will be immediately apparent that the concentration of the additives individually and collectively is substantially less than is required in most of the prior art compositions mentioned above. Because of this, the properties of the polypropylene are altered by only a minimal amount. Tensile strength, elongation, and other properties are little different from those of polypropylene without the additives.

The parameter used to indicate the combustion characteristics of a polymer composition is the combustion index (C.I.). This parameter is defined as the percentage of oxygen in an oxygen-nitrogen mixture which is just sufficient to burn completely a strip of the polymer ⅛ in. × ¼ in. × 5 inches held in an upright position and ignited at the top, i.e., $$C.I. = \frac{[O_2]}{[O_2]+[N_2]} \times 100$$

A C.I. of at least about 22 is required in order for the flame retardancy to be adequate to pass minimum safety requirements of federal and state governments.

Polypropylene which has not been specially treated for flame retardancy normally has a C.I. of about 17 to 18. The compositions according to this invention measure about 22 and higher as a rule.

The stereoregular propylene polymer which is employed in the compositions of this invention can be polypropylene homopolymer or a copolymer of propylene with a minor proportion, usually less than 25 weight percent, of a second olefin such as ethylene or butene-1. Such polymers are referred to by various names such as isotactic polypropylene, crystalline polypropylene, stereoregular polypropylene, and the like. For the sake of convenience all such polymers are herein referred to generically as stereoregular polymers of propylene.

The brominated compounds which are employed as flame retardants in this invention are aromatic-aliphatic ethers having at least one bromophenoxy linkage to an aliphatic radical and having at least three bromine substituents on each aromatic ring. Typical materials fitting this description include:

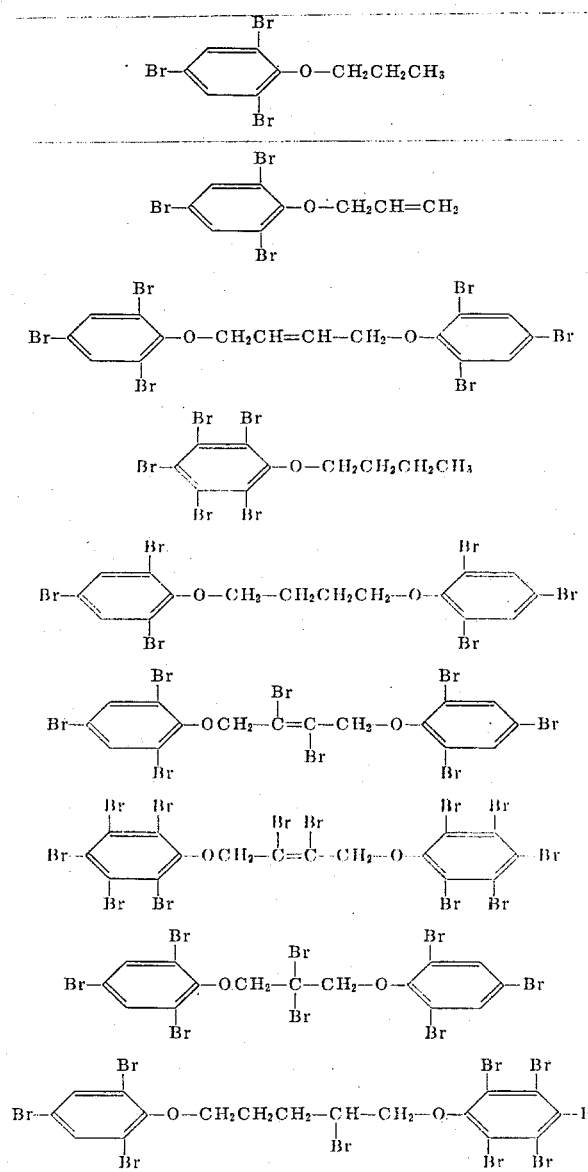

The above listing is intended as illustrative, but not limiting.

The second group of compounds employed in the flame-retardant compositions of this invention are alkyltin bis(alkyl-mercaptoesters). These are known additives for polymers which have been used in the past in the stabilization of poly(vinyl chloride). Exemplary of the alkyltin mercaptoesters which can be employed are dibutyltin-S,S'-bis(n-butylmercaptopropionate),
dibutyltin-S,S'-bis(n-hexylmercaptoacetate),
diethyltin-S,S'-bis(n-propylmercaptopropionate),
dibutyltin-S,S'-bis(n-octylmercaptobutyrate),
dihexyltin-S,S'-bis(n-octylmercaptovalerate),
dioctyltin-S,S'-bis(isooctylmercaptoacetate),
dioctyltin-S,S'-bis(n-octylmercaptobutyrate),
dihexyltin-S,S'-bis(ethylmercaptobutyrate),
dioctyltin-S,S'-bis(n-butylmercaptostearate),
dibutyltin-S,S'-bis(n-octylmercaptolaurate).

The polymer and the additives can be dry blended and extruded into molding powder or pellets. Alternatively, they can be thoroughly melt blended as on a paint mill or a three-roll mill followed by extrusion. The additives can also be dissolved in a solvent, and the solution mixed thoroughly with the polymer and the solvent removed prior to the extrusion or other forming operation.

Polypropylene formulated with the flame retardant additives according to this invention can be employed in any application where polypropylene is normally employed. This includes applications such as compression and injection molding, extrusion into films and spinning into fibers or filaments.

This invention is illustrated by the following non-limiting examples where parts and percentages are by weight unless otherwise indicated.

EXAMPLES 1 to 3

Polypropylene homopolymer specimens were prepared by blending varying amounts of 1,4-bis(2,4,6-tribromophenoxy)-2,3-dibromo-trans-butene-2 and dibutyltin-S,S'-bis(n-butylmercaptopropionate) with commercial isotactic polypropylene flake having an intrinsic viscosity of 2.5. The amounts of additive were chosen so as to prepare formulations containing the additive concentrations shown in Table I below. The polymer and additives were thoroughly blended in a Henschel mill. The compositions were then 2-roll milled for 8 minutes to effect uniform melt blending, following which they were compression molded into ⅛ inch plaques.

From each ⅛ inch plaque, specimens ⅛ in. × ¼ in. × 5 inches were cut. These were employed to determine the C.I. of the various compositions as shown in the following table.

TABLE I

| Example No. | % Flame Retardant | % Mercaptoester | C.I. |
|---|---|---|---|
| Control | - | - | 17.8 |
| 1 | 1 | 1 | 22.4 |
| 2 | 1 | 0.5 | 21.7 |
| 3 | 1 | 0.25 | 22.4 |

EXAMPLES 4 to 12

Additional specimens were prepared by mixing dry blends of various bromophenoxy alkyl ethers and stereoregular polypropylene homopolymer with 5 percent benzene solutions of alkyltin mercaptoesters. The amounts were chosen to correspond to the concentrations shown in Table II, below. After evaporation of the benzene, moldings were prepared and C.I. was determined as described above. The C.I. values observed are reported in Table II.

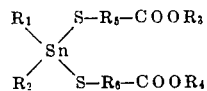

where $R_1$, $R_2$, $R_3$, and $R_4$ are the same or different alkyl groups having 1 to 18 carbon atoms and $R_5$ and $R_6$ are the same or different alkylene groups having 1 to 17 carbon atoms; and c. about 0.1 to 2 percent by weight of 1,4-bis (2,4,6-tribromophenoxy)-2,3-dibromo-trans-butene-2.

TABLE II

| Example | Flame retardant | Conc., percent | Mercaptoester | Conc., percent | C.I. |
|---|---|---|---|---|---|
| 4 | 1,4-bis(2,4,6-tribromophenoxy)-2,3-dibromo-trans-butene-2. | 1 | Di-n-octyltin-S,S'-bis(isooctylmercaptoacetate) | 1 | 23.0 |
| 5 | do | 1 | do | 0.5 | 22.8 |
| 6 | do | 1 | do | 0.25 | 23.7 |
| 7 | do | 1 | do | 0.1 | 25.0 |
| 8 | 1,4-bis(2,4,6-tribromophenoxy)-butene-2 | 1 | Dibutyltin-S,S'-bis(n-butylmercaptopropionate) | 0.25 | 22.2 |
| 9 | do | 1 | Dihexyltin-S,S'-bis(n-butylmercaptoacetate) | 0.25 | 22.5 |
| 10 | 1-(2,4,6-tribromophenoxy)-2,3-dibromopropane | 1 | Di-n-octyltin-S,S'-bis(isooctylmercaptoacetate) | 0.5 | 22.0 |
| 11 | do | 1 | do | 1.0 | 23.0 |
| 12 | do | 0.5 | Dibutyltin-S,S'-bis(n-octylmercaptolaurate) | 0.25 | 22.0 |

What I claim and desire to protect by Letters Patent is:

1. A flame retardant polymer composition comprising:
   a. about 96 to 99.8 percent by weight of a stereoregular polymer of propylene;
   b. about 0.1 to 2 percent by weight of dialkyltin mercaptoester having the general formula 2. A composition according to claim 1 where the dialkyltin mercaptoester is dibutyltin-S,S'-bis(n-butylmercaptopropionate).

3. A composition according to claim 1 where the dialkyltin mercaptoester is dioctyltin-S,S'-bis(isooctylmercaptoacetate).

* * * * *